United States Patent
Vincent et al.

(10) Patent No.: US 12,161,118 B2
(45) Date of Patent: *Dec. 10, 2024

(54) DYE-CONTAINING KAOLIN COMPOSITIONS FOR CROP PROTECTION AND IMPROVING PLANT PHYSIOLOGY

(71) Applicant: UNIVERSITY OF FLORIDA RESEARCH FOUNDATION, INCORPORATED, Gainesville, FL (US)

(72) Inventors: Christopher I. Vincent, Lakeland, FL (US); Myrtho Pierre, Kissimmee, FL (US); Juanpablo Salvatierra Miranda, Winter Haven, FL (US); Edgardo Juan Etxeberria, Auburndale, FL (US)

(73) Assignee: UNIVERSITY OF FLORIDA RESEARCH FOUNDATION, INCORPORATED, Orlando, FL (US)

( * ) Notice: Subject to any disclaimer, the term of this patent is extended or adjusted under 35 U.S.C. 154(b) by 760 days.

This patent is subject to a terminal disclaimer.

(21) Appl. No.: 17/279,786

(22) PCT Filed: Sep. 25, 2019

(86) PCT No.: PCT/US2019/052853
§ 371 (c)(1),
(2) Date: Mar. 25, 2021

(87) PCT Pub. No.: WO2020/068915
PCT Pub. Date: Apr. 2, 2020

(65) Prior Publication Data
US 2021/0337803 A1 Nov. 4, 2021

Related U.S. Application Data

(60) Provisional application No. 62/735,934, filed on Sep. 25, 2018, provisional application No. 62/827,145, filed on Mar. 31, 2019.

(51) Int. Cl.
*A01N 59/06* (2006.01)

(52) U.S. Cl.
CPC .................................. *A01N 59/06* (2013.01)

(58) Field of Classification Search
None
See application file for complete search history.

(56) References Cited

U.S. PATENT DOCUMENTS

| | | |
|---|---|---|
| 5,685,899 A | 11/1997 | Norris et al. |
| 5,976,241 A | 11/1999 | Kim et al. |
| 8,637,091 B2 | 1/2014 | Pluta et al. |
| 9,763,440 B2 | 9/2017 | Moudgil et al. |
| 2009/0156404 A1 | 1/2009 | Kupatt, Jr. |
| 2011/0073012 A1 | 3/2011 | Bundy |

FOREIGN PATENT DOCUMENTS

WO 2020068915 A1 4/2020

OTHER PUBLICATIONS

Jifon, John., "Kaolin Particle Film Applications Can Increase Photosynthesis and Water Use Efficiency of 'Ruby Red' Grapefruit Leaves", J. Amer. Soc. Hort. Sci., 2003, vol. 128, No. 1, pp. 107-112.
PCT/US2019/052853, PCT Search Report & Written Opinion, Mailed Date Feb. 6, 2020, 11 pages.

*Primary Examiner* — Alton N Pryor
(74) *Attorney, Agent, or Firm* — Timothy H. Van Dyke; Wolter, Van Dyke, Davis, PLLC

(57) ABSTRACT

The present application provides kaolin compositions that surprisingly increase the water use efficiency of plants, reduce the occurrence of insects on crop plants, and treat citrus trees infected with HLB.

7 Claims, 21 Drawing Sheets

Study design

- New planting from day 1
- Randomized complete block
  - 6 blocks
  - Location
- Plots
  - 20 treated trees
  - 6 data trees
- Treatments
  - White kaolin – Surround applied "as needed" + "sticker" adjuvant (SKH)
  - Red kaolin – dye added with binding agent + "sticker" adjuvant
  - Foliar insecticide – Calendar and psyllid pressure basis
  - Untreated control – systemic insecticides for leaf miner control

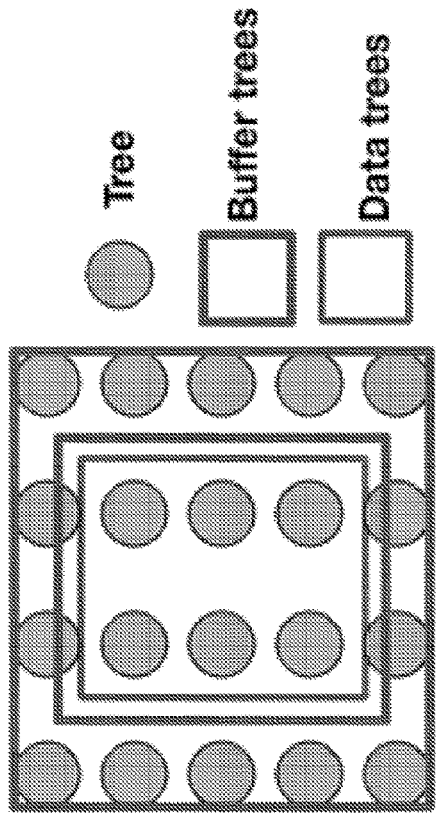

○ Tree
□ Buffer trees
□ Data trees

1 Plot (1 Replication of 1 Treatment)

- Variables
  - Reflectance
  - ACP counts weekly
    - All ACP on each tree
  - PCR CLas detection quarterly
  - Stem caliper
  - Flowering
  - Gas exchange
    - Photosynthesis, stomatal conductance, transpiration
    - $A_{max}$: with PPFD 1,000 µmols m$^{-2}$ s$^{-1}$, VPD -1.6 kPa, 400 ppm $CO_2$

FIG. 1

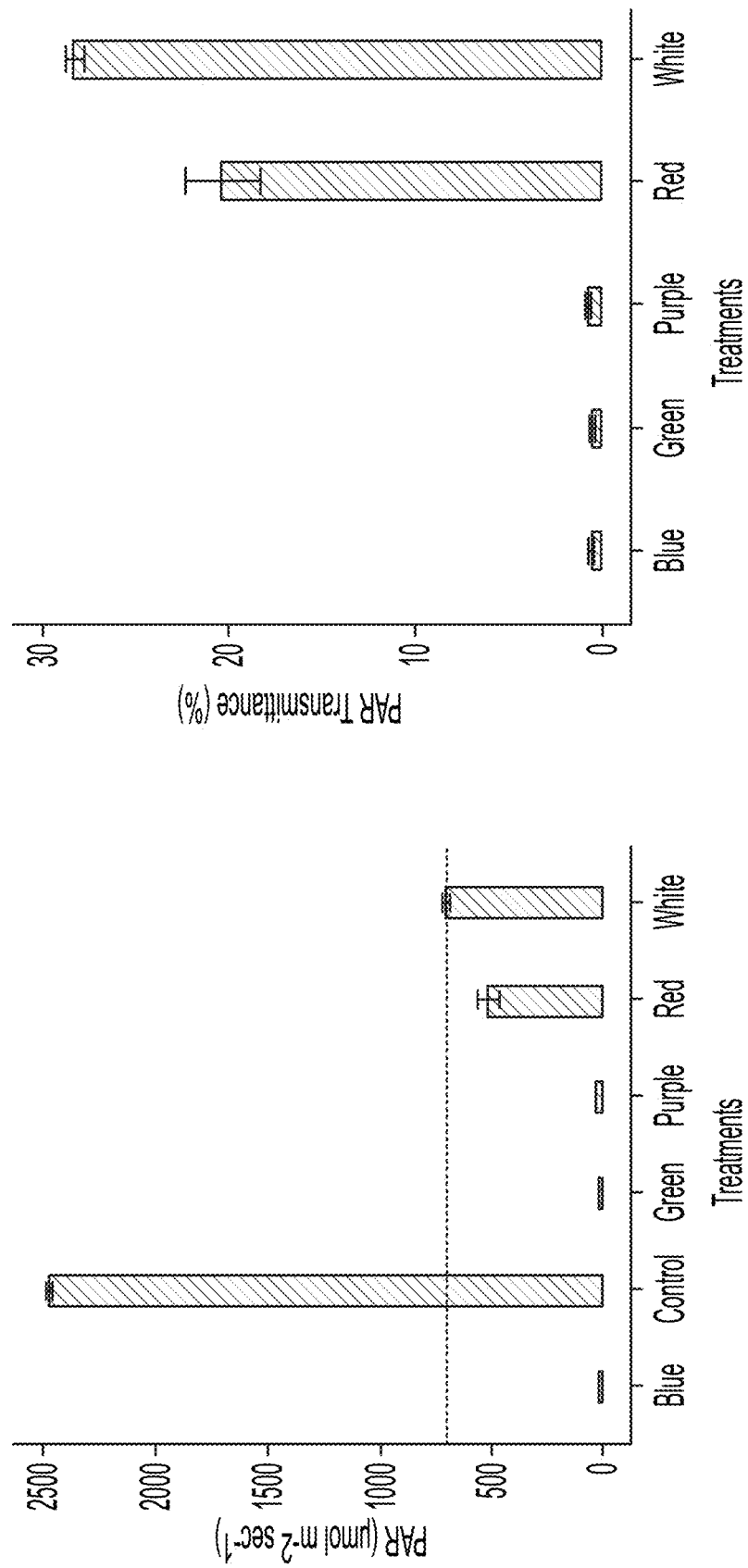

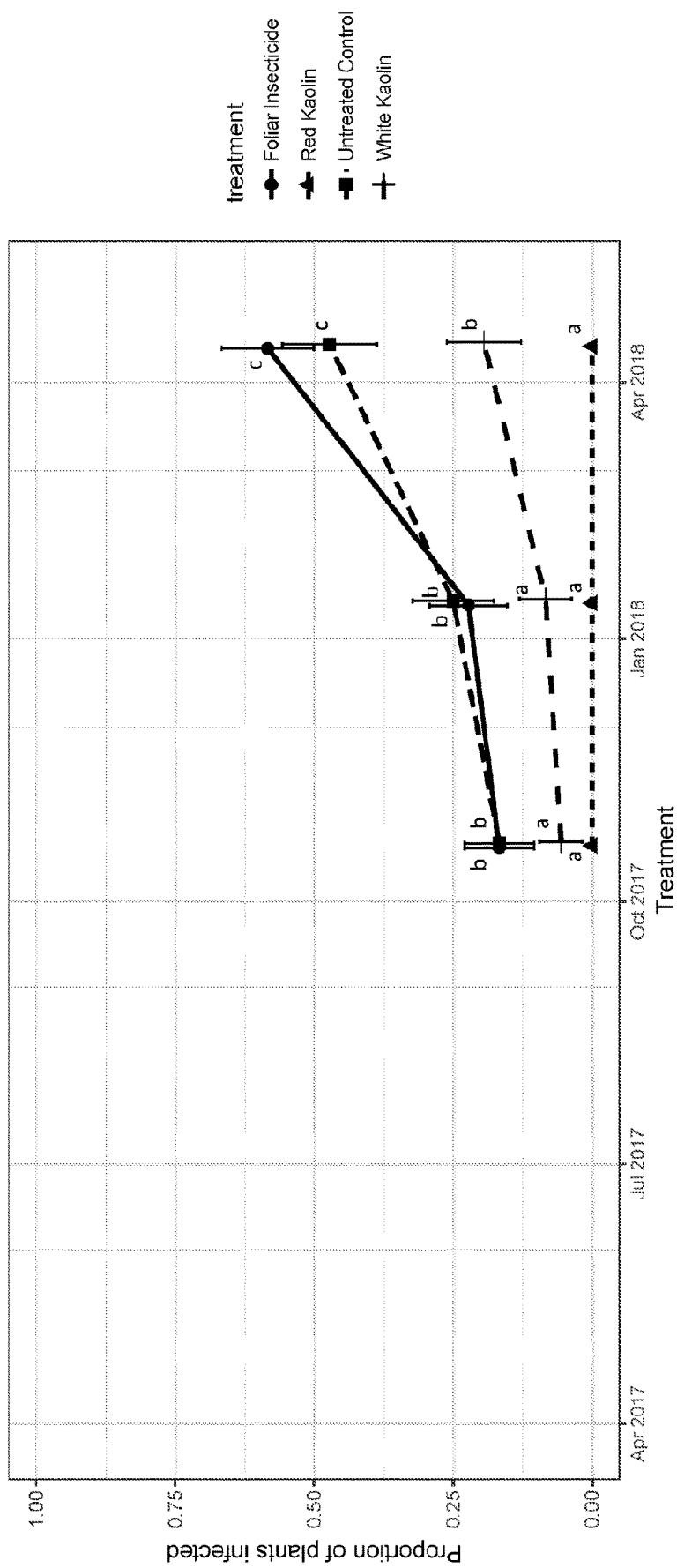

Results – ACP – as of August 2018

80% percent control of ACP in kaolin treatments vs. untreated control

- Red-dyed kaolin-treated plants had a higher relative growth rate than the controls.
- This was despite HLB infection, not just due to the prevention of infection.

DYE-CONTAINING KAOLIN COMPOSITIONS FOR CROP PROTECTION AND IMPROVING PLANT PHYSIOLOGY

BACKGROUND

Many substances can be used to modify plant growth or control pests. For example, herbicides are used to kill undesirable plants. Insecticides, pesticides and fungicides are used to control or prevent the growth of undesirable pests that damage plants and crops. The term pesticide generally includes herbicides, insecticides, fungicides and other agents used to control pests. Bactericides are used to control bacterial infestations in some fruit crops. Fertilizer, nutrients, and plant growth regulators can advantageously be applied to plant leaves or foliage. Many fertilizers and bactericides are known to have many undesirable effects.

One example of a particularly serious plant pest is Huanglongbing (HLB), also known as citrus greening. This is a very serious disease affecting citrus production worldwide that threatens the global citrus industry. In some areas, such as Florida, HLB has reduced crop production by up to 50% in the last 10 years. The multibillion dollar Florida citrus industry is severely threatened by this vector-disease pathosystem. Several bactericides (e.g., oxytetracycline and streptomycin) are known to exhibit efficacy against the Candidatus Liberibacter asiaticus (CLas), the causal bacteria of Huanglongbing.

Citrus trees that become infected with the citrus greening disease go into decline, producing misshapen, off-flavor fruit, and then die within a few years. The billion dollar (annual) Florida citrus industry is severely threatened by this vector-disease pathosystem. Further, the disease also threatens the citrus industry in California. There is, currently, no cure for this disease and trees are routinely destroyed once severely infected.

There is a need for safe and effective compositions to combat plant infections or improve growth and viability of infected plants.

BRIEF DESCRIPTION OF THE DRAWINGS

Certain embodiments are illustrated by way of example, and not by way of limitation, in the figures of the accompanying drawings.

FIG. 1 provides a diagram showing a study design for testing various dye-containing kaolin compositions. The diagram shows a single plot which was replicated 6 times for each treatment in a randomized complete block design. Kaolin treatments were reapplied after rain washed them off to maintain continuous coverage for 30 months after planting. Because the plants were initially young and small, applications rates were adjusted to be equivalent foliar coverage of the recommended 50 lbs per acre. Thus initial applications were 5 lbs per acre and final applications rates were 20 lbs per acre.

FIG. 2A provides a graph showing photosynthetic flux density (PPFD) measurements of transmittance of different kaolin treatments. Measurements were taken of transmittance when particle films were applied to the surface of a transparent pane of glass. Kaolin densities per unit area of glass were equivalent to leaf coverage at 50 lbs per acre in a mature planting or 1 g kaolin per 10 cm$^2$. PPFD was measured as mols photosynthetically active radiation (PAR, wavelengths of 400-700 nm) m$^{-2}$s$^{-1}$ using LI-180 handheld spectrometer.

FIG. 2B provides a graph showing % transmittance of PAR of particle films relative to an unobstructed transparent glass pane in the same arrangement as FIG. 2A.

DESCRIPTION

Figure 2C:
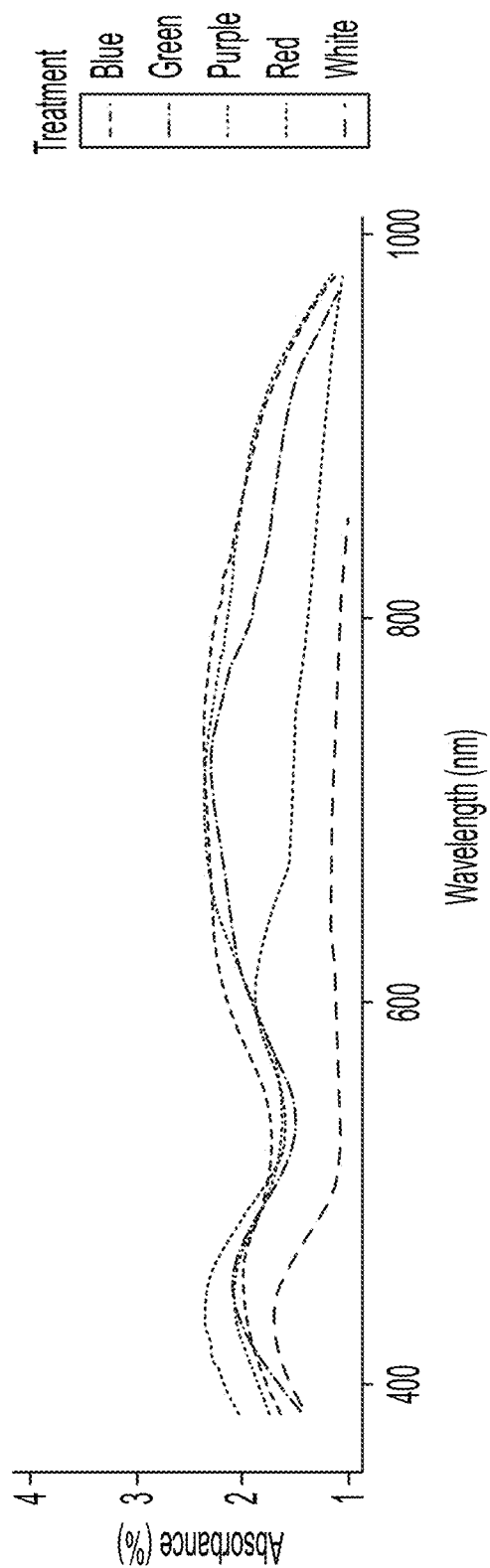
FIG. 2C Provides a graph showing effects of dyed particle film treatments on relative absorbance at each wavelength across the visible spectrum on the same glass panes as FIGS. 2A and 2B. Measurements were taken using the CI-700 portable leaf spectrometer.

Methods and compounds for use in enhancing the resistance to disease in plants are needed in the art, both to improve the productivity of healthy plants and to increase the plant's natural ability to combat disease and retain good crop productivity when infected. Embodiments of this invention provide methods and compositions to assist in these goals, and to treat plants that are affected by disease as well. For example, plants treated according to embodiments of the invention can exhibit defense against disease progression and disease symptoms, for example against HLB or Ca. *Liberibacter* infection. In the following description, for the purposes of explanation, certain specific details are set forth in order to provide a thorough understanding of the present invention. It will be apparent, however, to one skilled in the art, that the present invention may be practiced without these specific details.

The present disclosure is based on studies involving the production of dye-containing kaolin composition and determining the effects of these compositions on reducing insect pests and effecting manipulations of crop physiology to improve growth or water use efficiency. Specifically, red dyes have been found to reduce optically oriented insects, such as Asian citrus psyllids, having a greater effect than insecticides, and preventing infection with the disease they transmit. Although non-dyed kaolin particle films also reduce insect populations, red-dyed kaolin was found to have higher efficacy.

In addition, it is disclosed herein that red-dyed kaolin particle films increase photosynthesis, primarily increasing water use efficiency. While white dyes increase photosynthesis, red dyes have a more moderate effect on photosynthesis, but a strong effect of increasing water use efficiency. In the case of field-grown citrus, this higher water use efficiency results in a net increase of growth, with reduce water uptake, which provides a clear advantage for crop viability and growth during dry seasons. Without being limited to any particular theory, it is believed that this effect of red-dyed kaolin is the result of alterations in the blue light range and the red:far-red ratio.

Embodiments described herein can be applied to crop plants to repel insect pests and/or to improve water use efficiency resulting in increased growth with diminished water use. The dyed kaolin compositions described herein can also be used to reduce hydric demand of HLB-infected trees and maintain growth despite root loss and reduce water conductance capacity.

According to other embodiments, provided are new articles of manufacture. Such an article of manufacture can include a composition including kaolin (e.g. red dyed kaolin) composition. Such an article of manufacture can include a sprayer configured for spraying plants (e.g. citrus). Suitable sprayers configured for spraying citrus include those large enough to be towed behind a truck and that, for example, use air in forming a spray from a composition in a tank or other container. Suitable sprayers include electrostatic sprayers. Such an article of manufacture can include composition including a dye-containing kaolin composition and instructions for applying the composition to plants.

While a number of embodiments of the present invention have been shown and described herein in the present context, such embodiments are provided by way of example only, and not of limitation. Numerous variations, changes and substitutions will occur to those of skill in the art without materially departing from the invention herein. Any means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

Definitions

The term "applying," "application," "administering," "administration," and all their cognates, as used herein, refers to any method for contacting the plant with the dye-containing kaolin compositions discussed herein. Administration generally is achieved by application of the kaolin, in a vehicle compatible with the plant to be treated (i.e., a botanically compatible vehicle or carrier), such as an aqueous vehicle, to the plant or to the soil surrounding the plant. Any application means can be used, however preferred application is to the soil surrounding the plant, by soaking or spraying.

The term "botanically acceptable carrier/vehicle" or "botanically compatible carrier/vehicle," as used herein, refers to any non-naturally occurring vehicle, in liquid, solid or gaseous form which is compatible with use on a living plant and is convenient to contain a substance or substances for application of the substance or substances to the plant, its leaves or root system, its seeds, the soil surrounding the plant, or for injection into the trunk, or any known method of application of a compound to a living plant, preferably a crop plant, for example a citrus tree, or corn, soybean or tomato plant. Useful vehicles can include any known in the art, for example liquid vehicles, including aqueous vehicles, such as water, solid vehicles such as powders, granules or dusts, or gaseous vehicles such as air or vapor. Any vehicle which can be used with known devices for soaking, drenching, injecting into the soil or the plant, spraying, dusting, or any known method for applying a compound to a plant, is contemplated for use with embodiments of the invention. Typical carriers and vehicles contain inert ingredients such as fillers, bulking agents, buffers, preservatives, anti-caking agents, pH modifiers, surfactants, soil wetting agents, adjuvants, and the like. Suitable carriers and vehicles within this definition also can contain additional active ingredients such as plant defense inducer compounds, nutritional elements, fertilizers, pesticides, and the like. In a particular embodiment, the botanically acceptable vehicle pertains to a vehicle component, or vehicle formulation, that is not found in nature.

The term "crop plant," as used herein, includes any cultivated plant grown for food, feed, fiber, biofuel, medicine, or other uses. Such plants include, but are not limited to, citrus, corn, soybean, tomato, sugar cane, strawberry, wheat, rice, cassava, potato, cotton, and the like. The term "crop," as used herein, refers to any of the food (including fruits or juice), feed, fiber, biofuel, or medicine derived from a crop plant. All crop plants are contemplated for use with the invention, including monocots and dicots.

The term "effective amount" or "therapeutically effective amount," as used herein, means any amount of the dye-containing kaolin compositions, which improves health, growth or productivity of the plant, or which reduces the effects, titer or symptoms of the plant disease, or prevents worsening of the plant disease, symptoms or infection of the plant. In a specific example, effective amount is an amount that improves water-use efficiency of the treated plant. This term includes an amount effective to increase to increase growth rates of a plant or a plant population, to increase crop yield of a plant or plant population, increase crop quality in a plant or plant population, reduce the plant pathogen titer, to reduce the percent of infected plants in a plant population, to reduce the percent of plants showing disease symptoms in a plant or plant population, to reduce the disease symptom severity rating or damage rating of a plant or plant population, to reduce average pathogen population or titer in a plant or plant population by about 2%, about 5%, about 10%, about 20%, about 30%, about 40%, about 50%, about 60%, about 70%, about 75%, about 80%, about 85%, about 90%, or more, compared to plants or a plant population not treated with the active ingredient.

The term "healthy," as used herein, refers to a plant or plant population which is not known currently to be affected by a plant disease.

The term "faster growth," as used herein, refers to a measurable increase in the rate of growth of a plant, including stems, roots, seeds, flowers, fruits, leaves and shoots thereof.

The term "dry season" as used herein refers to 1-4 month long period of a geographical region wherein the total rainfall of the region in the 1-4 month long period is less than other months of a year.

The term "health," as used herein, refers to the absence of noticeable illness and a state of well-being and fitness, and refers to the level of functional or metabolic efficiency of the plant, including the ability to adapt to conditions and to combat disease, while maintaining growth and development.

The term "vigor," as used herein, refers to the health, vitality and hardiness of a plant, and its capacity for natural growth and survival. Therefore, the phrase "health and vigor of a plant," as used herein, means the absence of illness, a high level of functional or metabolic efficiency, the ability to combat disease, and the maintenance of good growth and development, and the efficient production of crops.

Adjuvants

The antimicrobial composition of the invention can also include any number of adjuvants. Specifically, the composition of the invention can include additional antimicrobial agent, wetting agent, defoaming agent, thickener, a surfactant, foaming agent, aesthetic enhancing agent (i.e., colorant (e.g., pigment), odorant, or perfume), among any number of constituents which can be added to the composition, or combinations of the foregoing. In exemplary embodiments, an adjuvant is any material that when added to a spray solution enhances or modifies the action of a pesticide. A surfactant is a class of adjuvant including any compound which possesses distinct hydrophilic and lipophilic regions, which allow it to reduce the surface tension when mixed with water. Example chemical classes include, but are not be limited to: Alcohol alkoxylates, Alkylaryl ethoxylates, Fatty amine ethoxylates, Organosilicones, Some surfactants include multiple active constituents.

In addition to surfactants, other types of adjuvants would include oils (petroleum and crop based), acidifiers, buffers, and others.

Adjuvants can be preformulated with the dye-containing kaolin composition or added to the system simultaneously, or even after, the addition of the dye-containing kaolin composition. Composition embodiments can also contain any number of other constituents as necessitated by the application, which are known and which can facilitate the activity of the present invention.

Additional Antimicrobial Agent

The disclosed dye-containing kaolin compositions can further include antimicrobial agent. Additional antimicrobial agent can be added to use compositions before use. Suitable antimicrobial agents include, but are not limited to, peroxycarboxylic acid (e.g., medium chain (e.g., C5-C12, C6 to C10, or C8) peroxycarboxylic acid or mixed medium chain and short chain (e.g., C2-C4) peroxycarboxylic acid (e.g., C2 and C8)), carboxylic esters (e.g., p-hydroxy alkyl benzoates and alkyl cinnamates), sulfonic acids (e.g., dodecylbenzene sulfonic acid), iodo-compounds or active halogen compounds (e.g., elemental halogens, halogen oxides (e.g., NaOCl, HOCl, HOBr, $ClO_2$), iodine, interhalides (e.g., iodine monochloride, iodine dichloride, iodine trichloride, iodine tetrachloride, bromine chloride, iodine monobromide, or iodine dibromide), polyhalides, hypochlorite salts, hypochlorous acid, hypobromite salts, hypobromous acid, chloro- and bromo-hydantoins, chlorine dioxide, and sodium chlorite), organic peroxides including benzoyl peroxide, alkyl benzoyl peroxides, ozone, singlet oxygen generators, and mixtures thereof, phenolic derivatives (e.g., o-phenyl phenol, o-benzyl-p-chlorophenol, tert-amyl phenol and $C_1$-$C_6$alkyl hydroxy benzoates), quaternary ammonium compounds (e.g., alkyldimethylbenzyl ammonium chloride, dialkyldimethyl ammonium chloride and mixtures thereof), aminoglycosides (Streptomycin, kasugamycin), tretracyclines (oxytetracycline), *Bacillus* biologicals (*Bacillus subtilis, Bacillus amyloliquefaciens*), *Pantoea* biologicals (*Pantoea agglomerans*), *Pseudomonas* biologicals (*Pseudomonas fluorescens*), Bacteriophages (many phage strains), and mixtures of such antimicrobial agents, in an amount sufficient to provide the desired degree of microbial protection.

The present dye-containing kaolin compositions can include an effective amount of additional antimicrobial agent, such as about 0.001 wt-% to about 60 wt-% antimicrobial agent, about 0.01 wt-% to about 15 wt-% antimicrobial agent, or about 0.08 wt-% to about 2.5 wt-% antimicrobial agent.

Use Compositions

The present compositions may include concentrate compositions and use compositions. For example, a concentrate composition can be diluted, for example with water, to form a use composition. In an embodiment, a concentrate composition can be diluted to a use solution before to application to an object. For reasons of economics, the concentrate can be marketed and an end user can dilute the concentrate with water or an aqueous diluent to a use solution.

The level of active components in the concentrate composition is dependent on the intended dilution factor and the desired activity of the composition components. Generally, a dilution of about 1 fluid ounce to about 20 gallons of water to about 5 fluid ounces to about 1 gallon of water is used for aqueous antimicrobial compositions. Higher use dilutions can be employed if elevated use temperature (greater than 25° C.) or extended exposure time (greater than 30 seconds) can be employed. In the typical use locus, the concentrate is diluted with a major proportion of water using commonly available tap or service water mixing the materials at a dilution ratio of about 3 to about 20 ounces of concentrate per 100 gallons of water. For example, the use composition can include Surf acme diluted 1:2, 1:4 or 1:8.

For example, a use composition can include about 0.01 to about 4 wt-% of a concentrate composition and about 96 to about 99.99 wt-% diluent; about 0.5 to about 4 wt-% of a concentrate composition and about 96 to about 99.5 wt-% diluent; about 0.5, about 1, about 1.5, about 2, about 2.5, about 3, about 3.5, or about 4 wt-% of a concentrate composition; about 0.01 to about 0.1 wt-% of a concentrate composition; or about 0.01, about 0.02, about 0.03, about 0.04, about 0.05, about 0.06, about 0.07, about 0.08, about 0.09, or about 0.1 wt-% of a concentrate composition. Amounts of an ingredient in a use composition can be calculated from the amounts listed above for concentrate compositions and these dilution factors.

EXAMPLES

The studies described herein have shown that the compounds and compositions according to embodiments of the invention have desirable effects on citrus plants, their productivity and their ability to combat disease. In particular, the compositions described herein improve water efficiency of either healthy or infected plants. These effects are generalized and widespread, and can provide benefits to the health and vigor of citrus plants, and improvements in fighting a wide variety of diseases. Any plant is contemplated for use with the invention, both healthy plants and those which have been exposed to or may be exposed to a plant pathogen or a carrier of a plant pathogen.

Example 1

Dye-Kaolin Preparation

One method of preparing dye kaolin compositions includes the following steps:
  Dye is dissolved in a solution of water and cetylpyridinium chloride (CPC, an agent used to bind dye to clay, as per Moudgil et al., 2014 patent).
  Dye solution is dissolved into emulsion of kaolin clay and mixed for at least 2 hours.
  The quantity of dye and CPC vary depend on the dye. CPC ranges from 0-40 mg CPC and 5-800 mg dye for each gram of clay.
  In a specific embodiment, the dye used is red dye. In an even more specific embodiment, the red dye is Red LX-11271 (Pylam Dyes). Other Dyes that may be implemented include (Pylam Dyes):
    Blue: S-726A, LX-7379
    Violet: 74470, samp1219171
    Green: LX-10226, LX-11774

U.S. Patent Publication 20170027165 is incorporated herein in its entirety for supporting information of dye-containing kaolin compositions and methods of making same.

Example 2

Field Study

Objectives
  Compare red-dyed kaolin,
  undyed kaolin and foliar
  insecticides for:
  Effects on ACP
  Effects on infection rate
  Effects on growth, photosynthesis,
  and horticultural characteristics
  Subsequently interactions with
  disease.

FIG. 1 provides a diagram showing a study design for testing various dye-containing kaolin compositions. The diagram shows a single plot which was replicated 6 times for each treatment in a randomized complete block design. Kaolin treatments were reapplied after rain washed them off to maintain continuous coverage for 30 months after planting. Because the plants were initially young and small, applications rates were adjusted to be equivalent foliar coverage of the recommended 50 lbs per acre. Thus initial applications were 5 lbs per acre and final applications rates were 20 lbs per acre.

Photosynthetic flux density (PPFD) measurements of transmittance of different kaolin treatments were measured (see FIG. 2A). Measurements were taken of transmittance when particle films were applied to the surface of a transparent pane of glass. Kaolin densities per unit area of glass were equivalent to leaf coverage at 50 lbs per acre in a mature planting or 1 g kaolin per 10 $cm^2$. PPFD was measured as mols photosynthetically active radiation (PAR, wavelengths of 400-700 nm) $m^{-2}s^{-1}$ using LI-180 handheld spectrometer. As shown in FIG. 2B, percent transmittance of PAR of particle films relative to an unobstructed transparent glass pane were also measured according to the same arrangement as FIG. 2A.

As shown in FIG. 2C, effects of dyed particle film treatments on relative absorbance at each wavelength across the visible spectrum on the same glass panes as FIGS. 2A and 2B were also determined. Measurements were taken using the CI-700 portable leaf spectrometer.

Figure 2D:
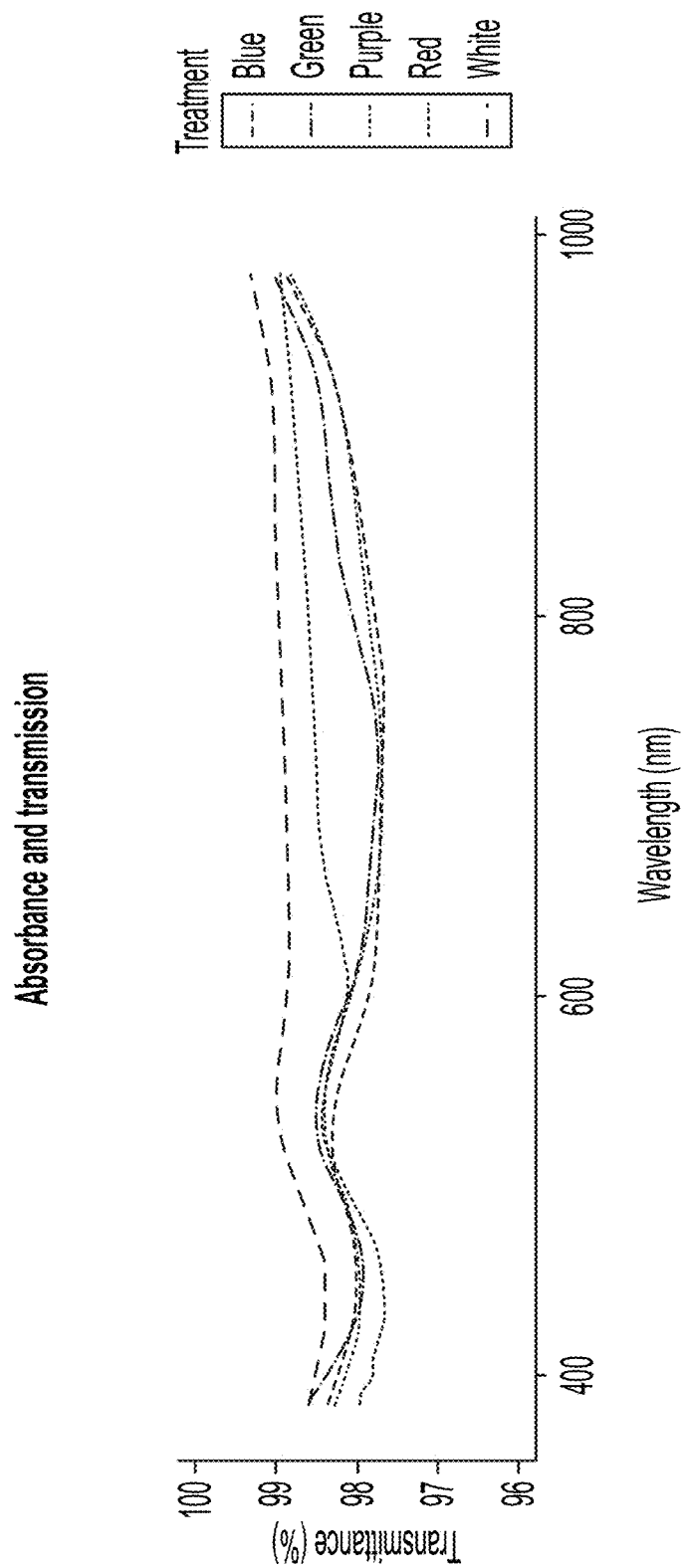
FIG. 2D Provides a graph showing effects of dyed particle film treatments on relative transmittance at each wavelength across the visible spectrum on the same glass panes as FIGS. 2A and 2B. Measurements were taken using the CI-700 portable leaf spectrometer.
Figures 2E, 2F:
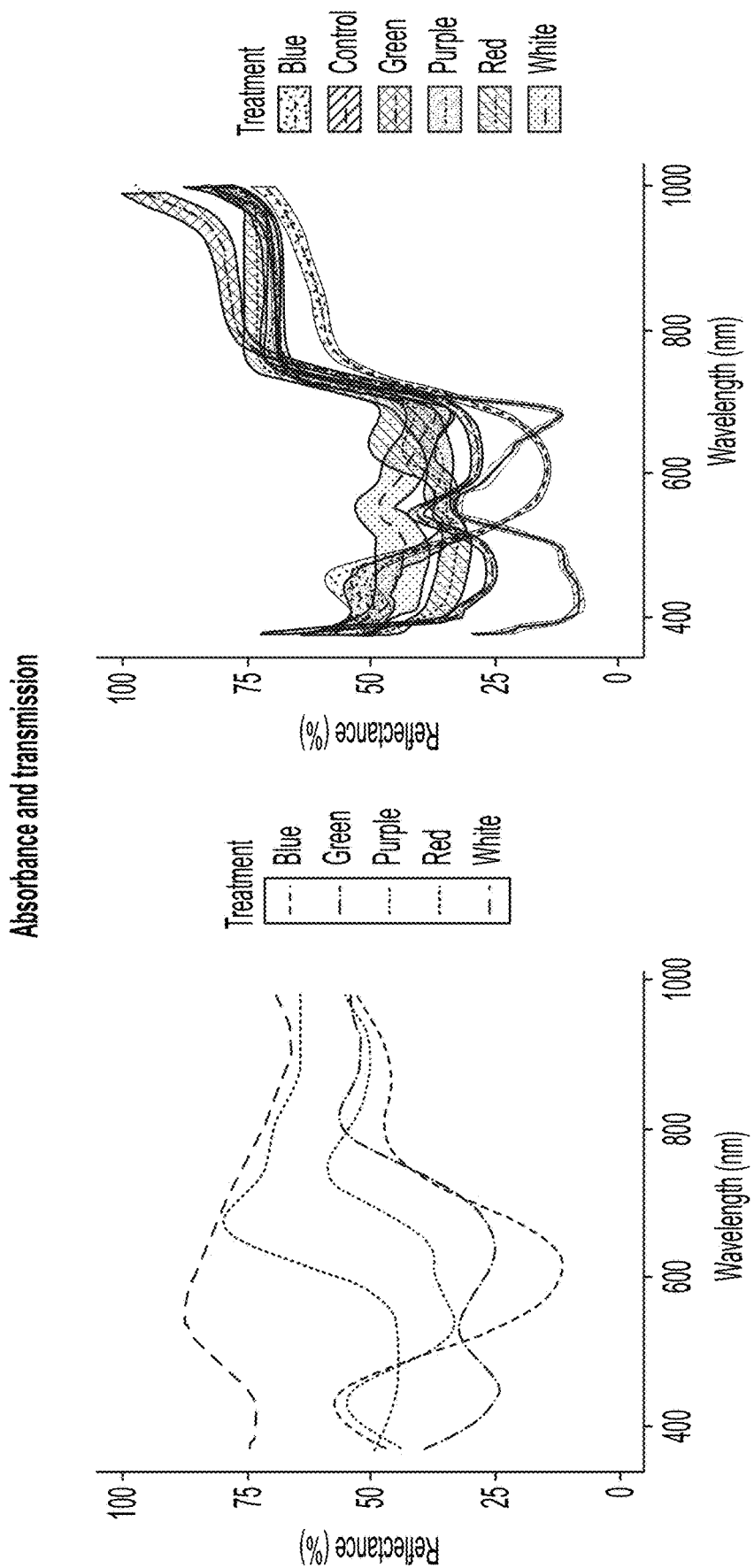
FIG. 2E Provides a graph the same measure of reflectance as FIG. 2F, but in this case the measure has been standardized relative to the control.
FIG. 2F Provides a graph the same measure of reflectance as FIG. 2C, but on leaves when the same particle film density was applied. Control indicates a leaf with no particle film, FIG. 3 provides a graph showing effects of kaolin treatment on proportion of plants infected with Candidatus Liberibacter asiaticus (Las) in the field study. Foliar samples were collected quarterly and infection was detected using qPCR detection of a 16S primer specific to Las, which was used to assign the category of infected or uninfected to each plant. The proportion was calculated for each plot of 6 data plants (See FIG. 1).

As shown in FIG. 2D, effects of dyed particle film treatments on relative transmittance at each wavelength across the visible spectrum on the same glass panes as discussed for FIGS. 2A and 2B were determined. Measurements were taken using the CI-700 portable leaf spectrometer. FIG. 2F Provides a graph the same measure of reflectance as FIG. 2C, but on leaves when the same particle film density was applied. Control indicates a leaf with no particle film. FIG. 2E provides a graph the same measure of reflectance as FIG. 2F, but in this case the measure has been standardized relative to the control, FIG. 3 provides a graph showing effects of kaolin treatment on proportion of plants infected with Candidatus Liberibacter asiaticus (Las) in the field study. Foliar samples were collected quarterly and infection was detected using qPCR detection of a 16S primer specific to Las, which was used to assign the category of infected or uninfected to each plant. The proportion was calculated for each plot of 6 data plants (See FIG. 1).

Figure 4:
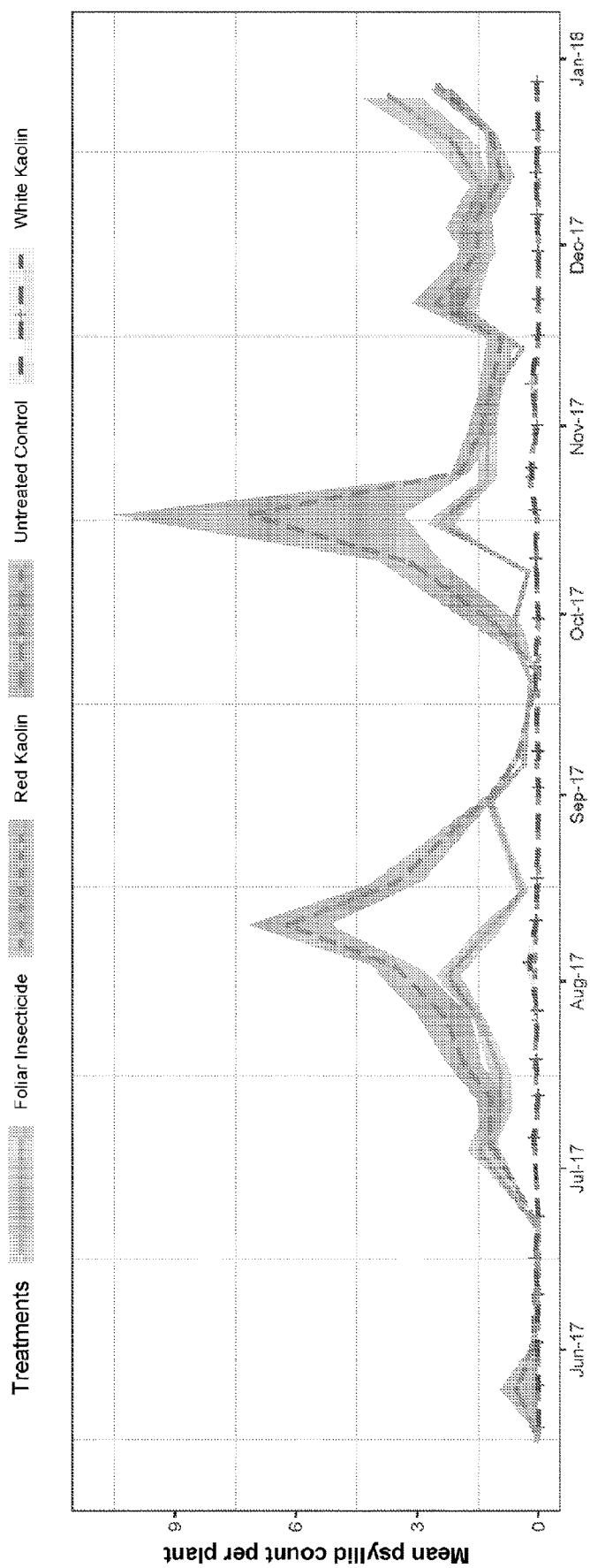
FIG. 4 provides a graph showing effects of kaolin treatment on number of psyllids per tree each week for 2017.
Figure 5:
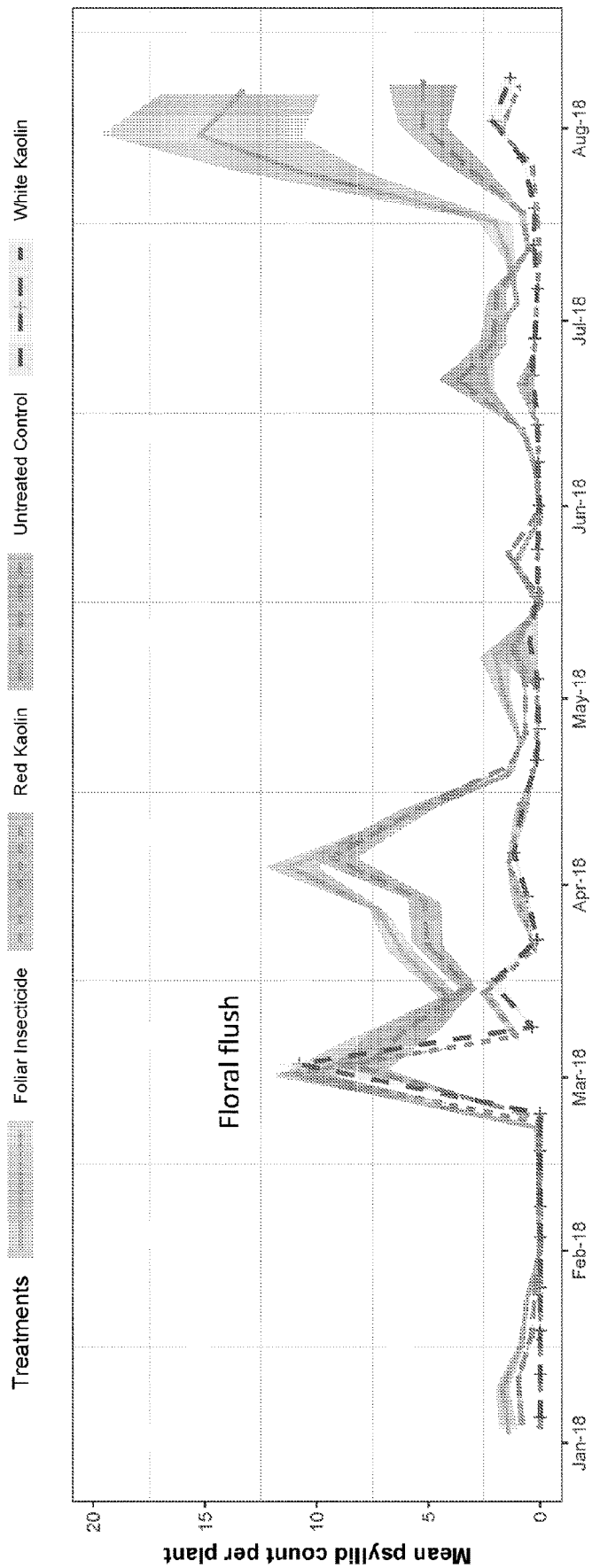
FIG. 5 provides a graph showing effects of kaolin treatment on number of psyllids per tree each week for 2018. Floral flush is the short period of growth in which flowering stems are produced.

FIG. 4 provides a graph showing effects of kaolin treatment on number of psyllids per tree each week for 2017. FIG. 5 provides a graph showing effects of kaolin treatment on number of psyllids per tree each week for 2018. Floral flush is the short period of growth in which flowering stems are produced.

Figure 6:
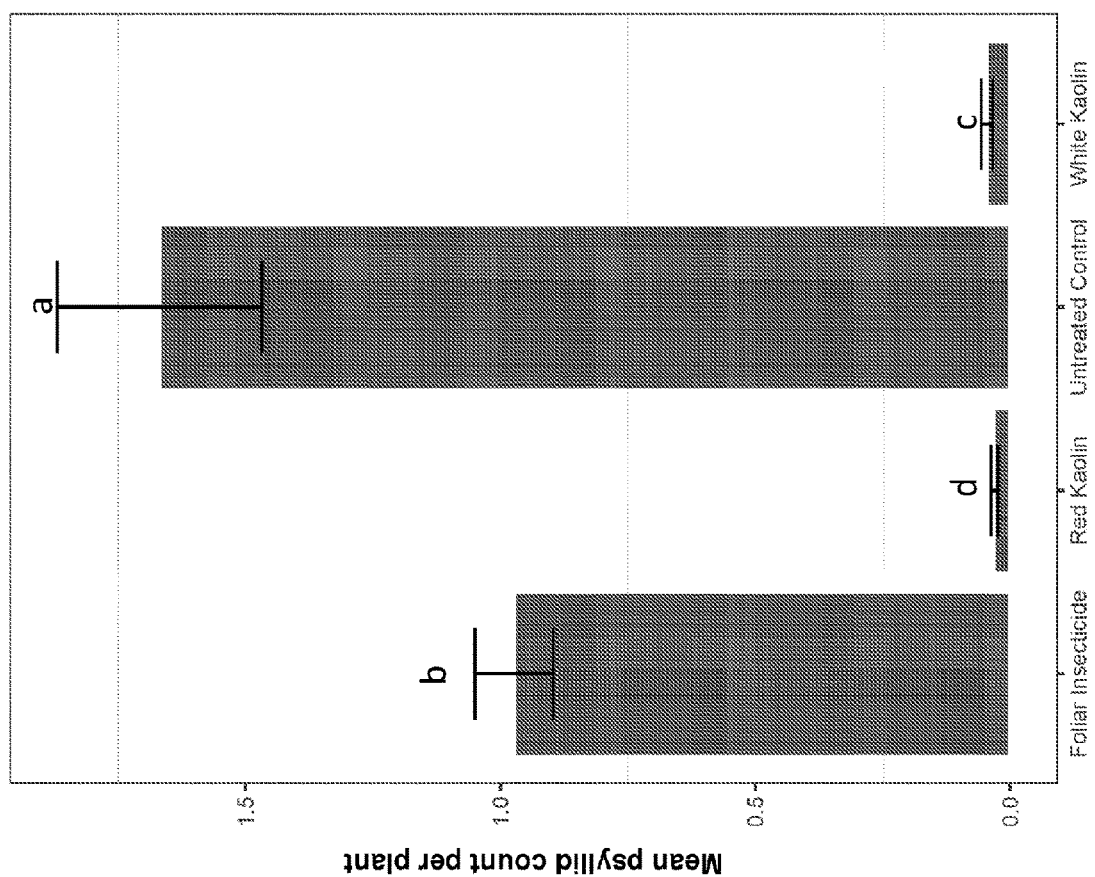
FIG. 6 provides a graph showing effects of kaolin treatment on mean psyllid count from May-December 2017.
Figure 7:
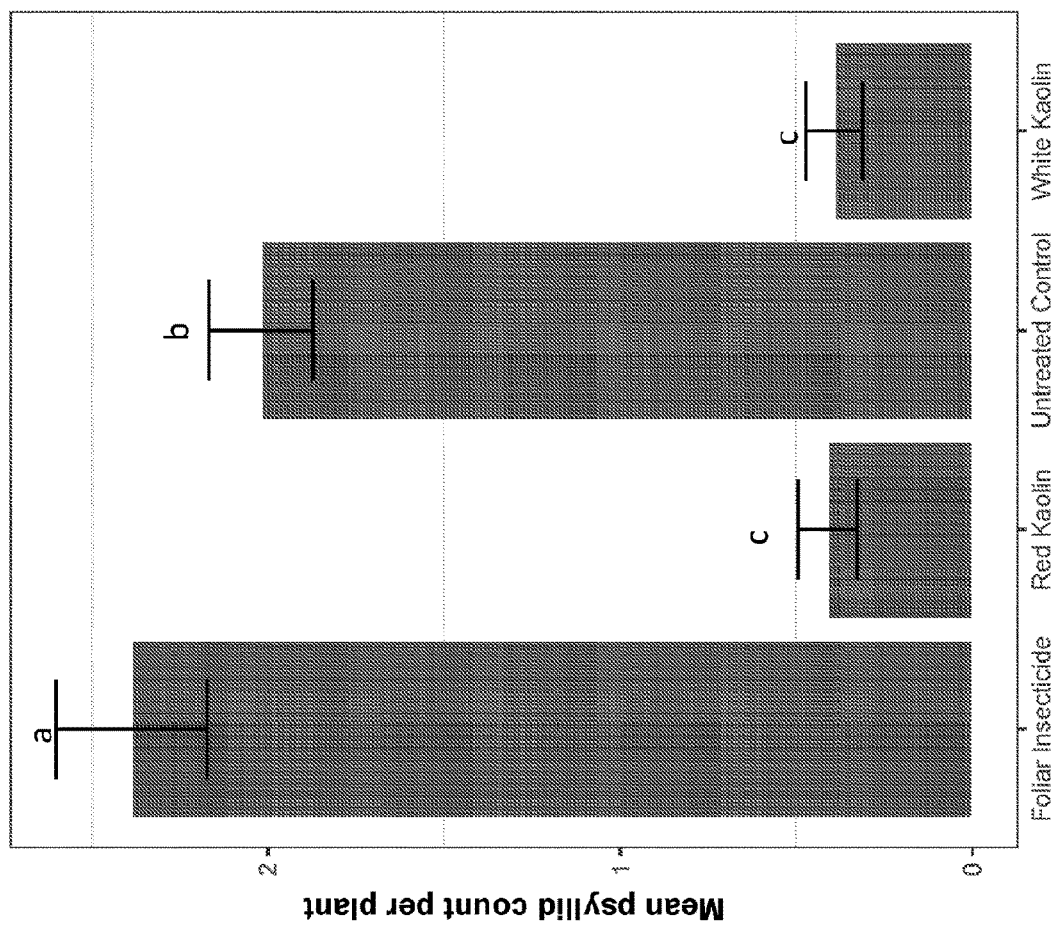
FIG. 7 provides a graph showing effects of kaolin treatment on mean psyllid count May 2017-August 2018.
Figure 8:
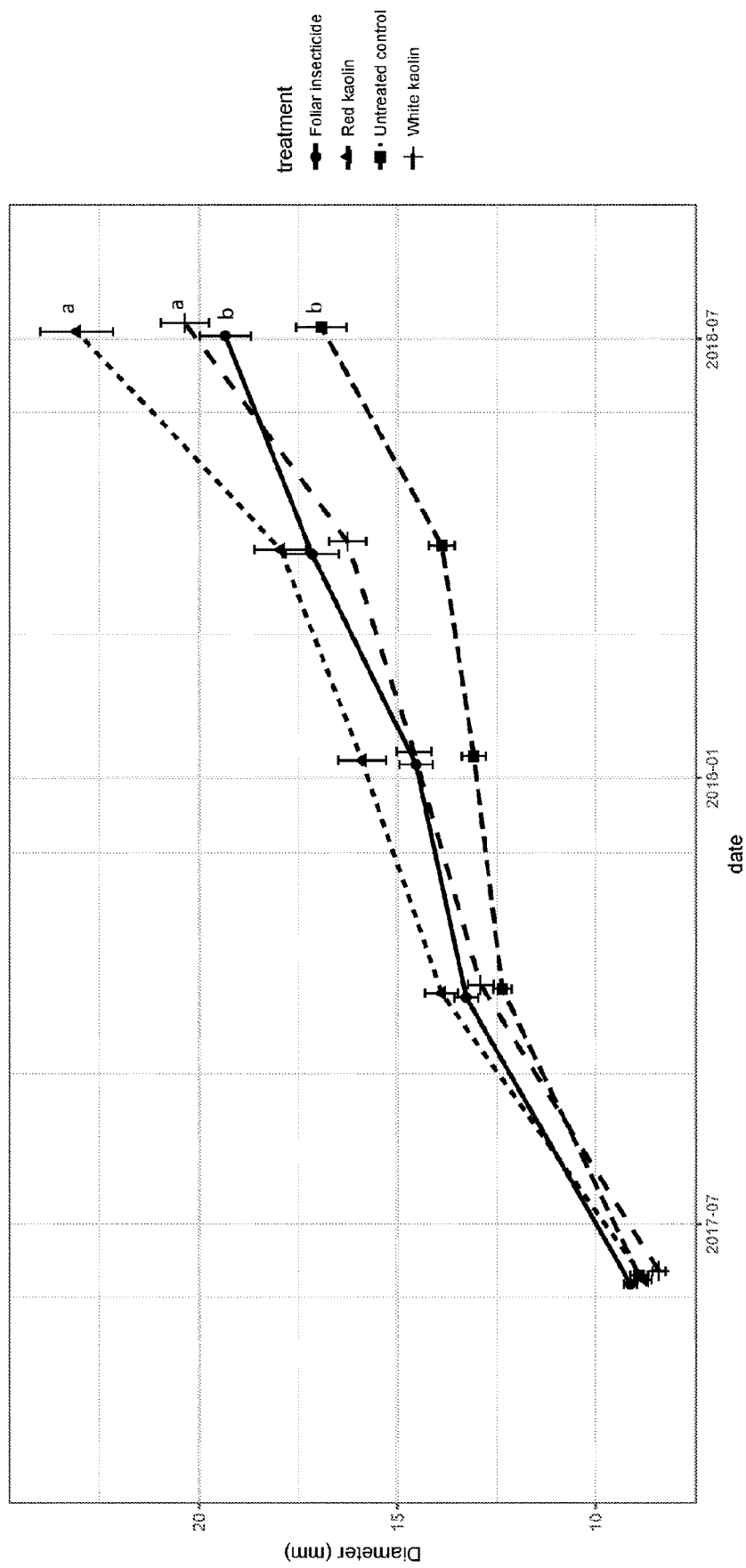
FIG. 8 Provides a graph showing effects of kaolin treatment on tree stem diameter.
Figure 9:
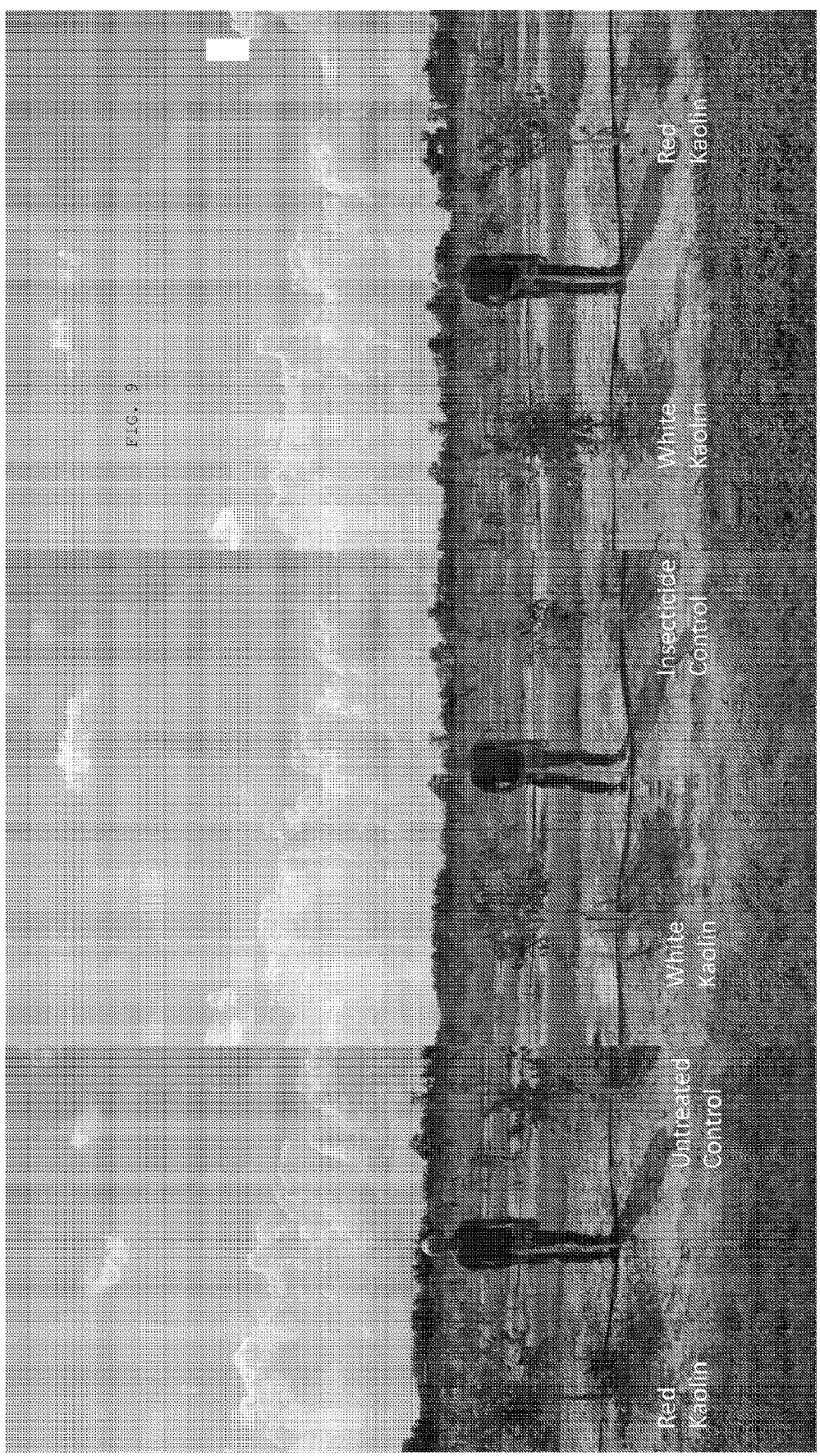
FIG. 9 provides photographs showing effects of kaolin treatment on canopy growth.
Figure 10:
FIG. 10 provides photographs showing effects of treatments on tree height.
Figure 11:
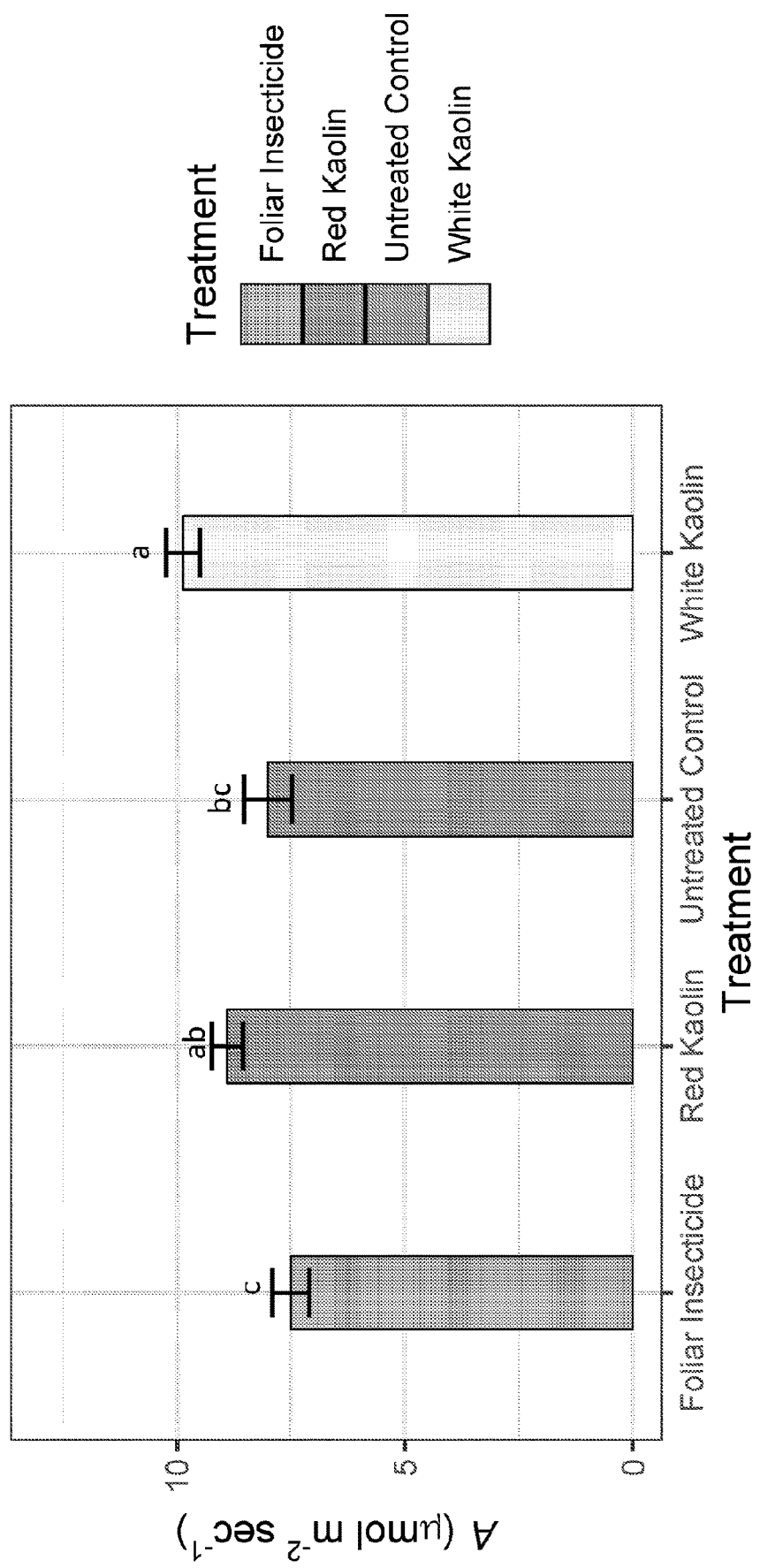
FIG. 11 provides a graph showing effects of kaolin treatment on photosynthesis (A; Net $CO_2$ assimilation). Measurements were taken on mornings of multiple dates using an LI-6800 infrared gas analyzer.

FIG. 6 provides a graph showing effects of kaolin treatment on mean psyllid count from May-December 2017. FIG. 7 provides a graph showing effects of kaolin treatment on mean psyllid count May 2017-August 2018. FIG. 8 Provides a graph showing effects of kaolin treatment on tree stem diameter. FIG. 9 provides photographs showing effects of kaolin treatment on canopy growth. FIG. 10 provides photographs showing effects of treatments on tree height. FIG. 11 provides a graph showing effects of kaolin treatment on photosynthesis (A; Net $CO_2$ assimilation). Measurements were taken on mornings of multiple dates using an LI-6800 infrared gas analyzer.

Figure 12:
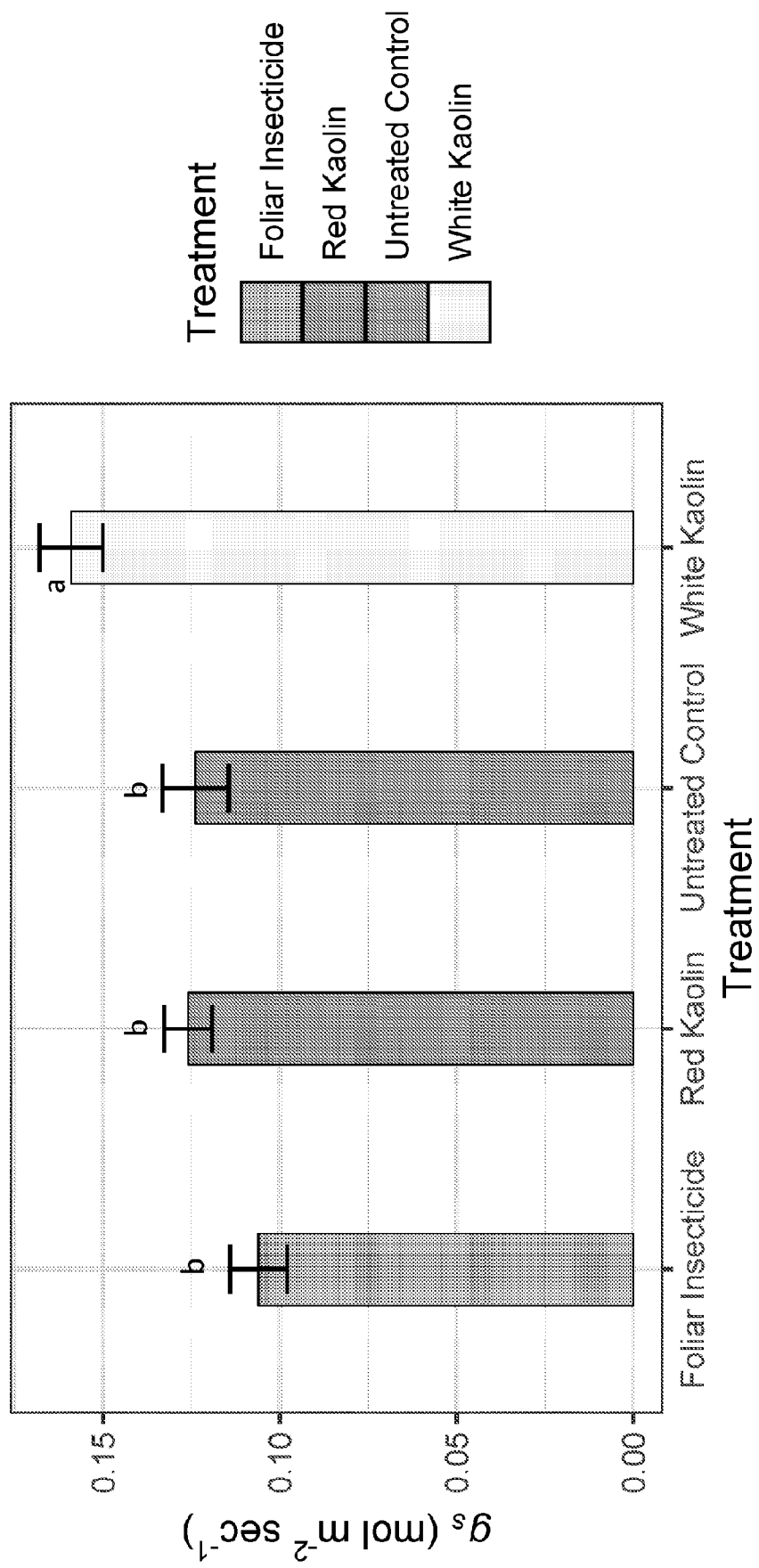
FIG. 12 provides a graph showing effects of kaolin treatment on stomatal conductance. Measurements were taken on mornings of multiple dates using an LI-6800 infrared gas analyzer.
Figure 13:
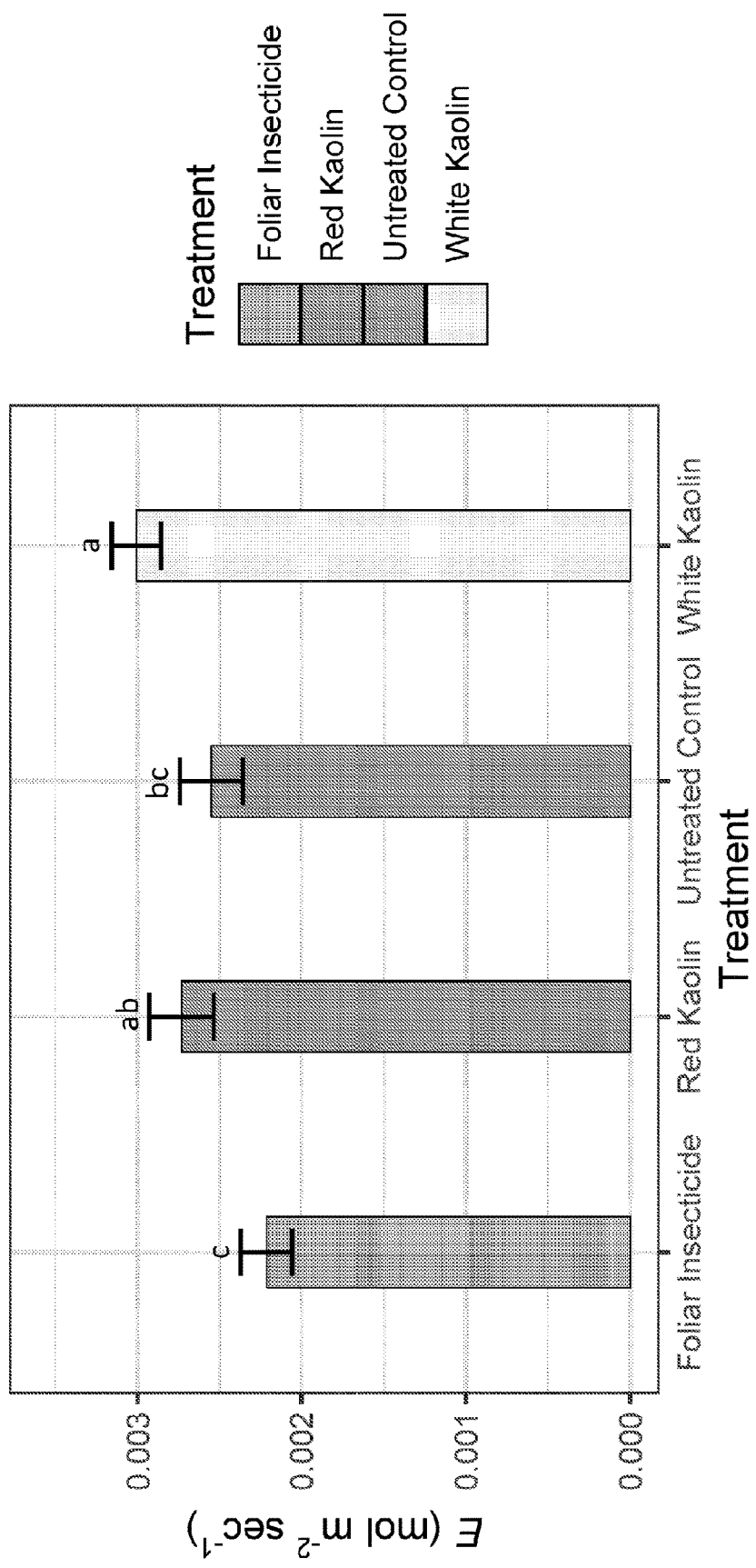
FIG. 13 provides a graph showing effects of kaolin treatment on transpiration (E). Measurements were taken on mornings of multiple dates using an LI-6800 infrared gas analyzer.
Figure 14:
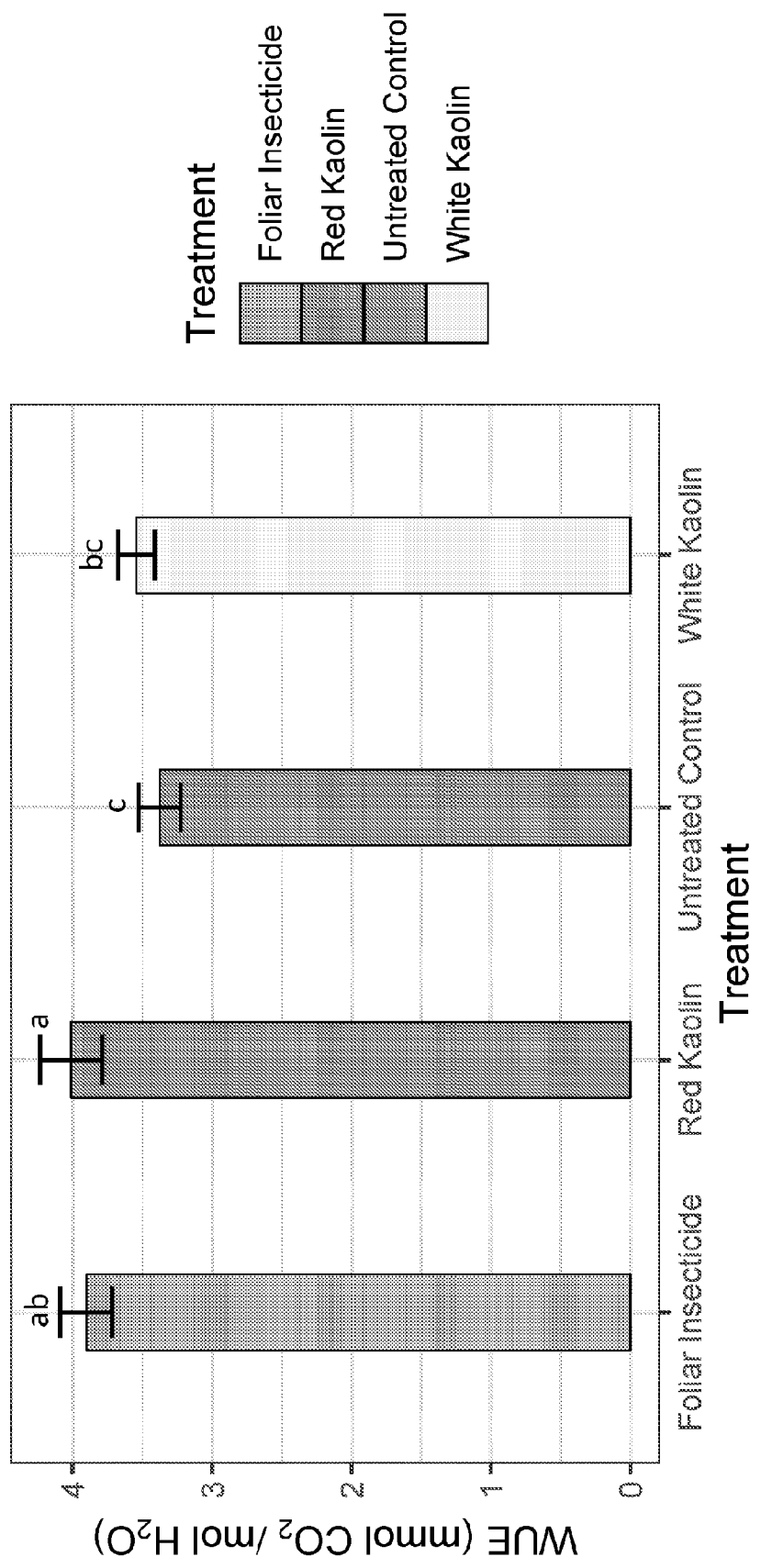
FIG. 14 provides a graph showing effects of kaolin treatment on water use efficiency ($CO_2$ assimilated per $H_2O$ lost). This was calculated as A/E as shown in FIGS. 11 and 13.

FIG. 12 provides a graph showing effects of kaolin treatment on stomatal conductance. Measurements were taken on mornings of multiple dates using an LI-6800 infrared gas analyzer. FIG. 13 provides a graph showing effects of kaolin treatment on transpiration (E). Measurements were taken on mornings of multiple dates using an LI-6800 infrared gas analyzer. FIG. 14 provides a graph showing effects of kaolin treatment on water use efficiency ($CO_2$ assimilated per $H_2O$ lost). This was calculated as NE as shown in FIGS. 11 and 13.

Example 3

Figure 15:
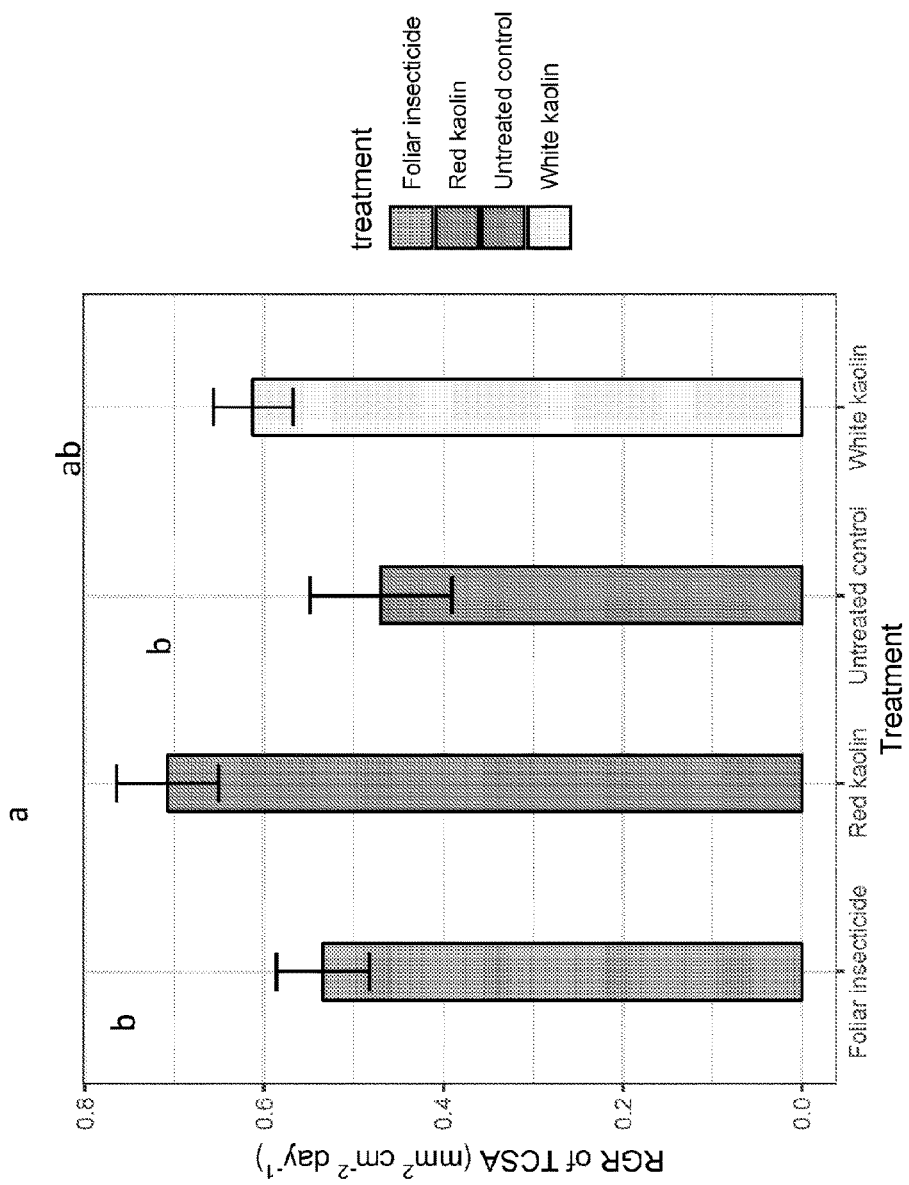
FIG. 15 provides a graph showing effects of kaolin treatment on relative growth rate of trunk cross-sectional area. Trunk cross-sectional area is calculated as TCSA=$\pi$*diameter$^2$. Relative growth rate is calculated on a quarterly basis as $RGR_{TCSA}$=(TCSA$_2$−TCSA$_1$)/TCSA$_1$*(Time$_2$−Time$_1$) resulting in units of mm$^2$ cm$^{-2}$ day$^{-1}$ FIG. 16 provides a graph showing net $CO_2$ assimilation in the morning and afternoon of potted plants that received treatments of 1) water deficit with no particle film (WDNF), 2)water deficit red film (WDRF), 3) water deficit white film (WDWF), 4) well watered no film (WWNF). Water deficit was daily watering to a maximum of −20 kPa and well watered was daily watering to field capacity.

Field Study 4 treatments of citrus plants
Foliar insecticides
No foliar insecticides-no kaolin
White kaolin
Red kaolin Red kaolin was prepared as described in Examples 1 and 2 above. Kaolin treatments were repeated any time rain washed the previous application off. FIG. 15 provides a graph showing effects of kaolin treatment on relative growth rate of trunk cross-sectional area. Trunk cross-sectional area is calculated as TCSA=$\pi$*diameter$^2$. Relative growth rate is calculated on a quarterly basis as $RGR_{TCSA}$=(TCSA$_2$-TCSA$_1$)/TCSA$_1$*(Time$_2$-Time$_1$) resulting in units of mm$^2$ cm$^{-2}$ day$^{-1}$. As shown, kaolin treatment resulted in improved growth rate.

Example 4

Potted Study

Plants were exposed to a controlled mild water deficit for three weeks
Treatments were
No kaolin, no deficit (WWNF)
No kaolin, deficit (WDNF)
White kaolin deficit (WDWF)
Red kaolin deficit (WDRF)
Gas exchange was measured throughout in morning and afternoon periods.
Water loss was measured daily at 3 pm, gravimetrically
Leaf water potential was measured at the end of the deficit period.

Results

Figure 16:
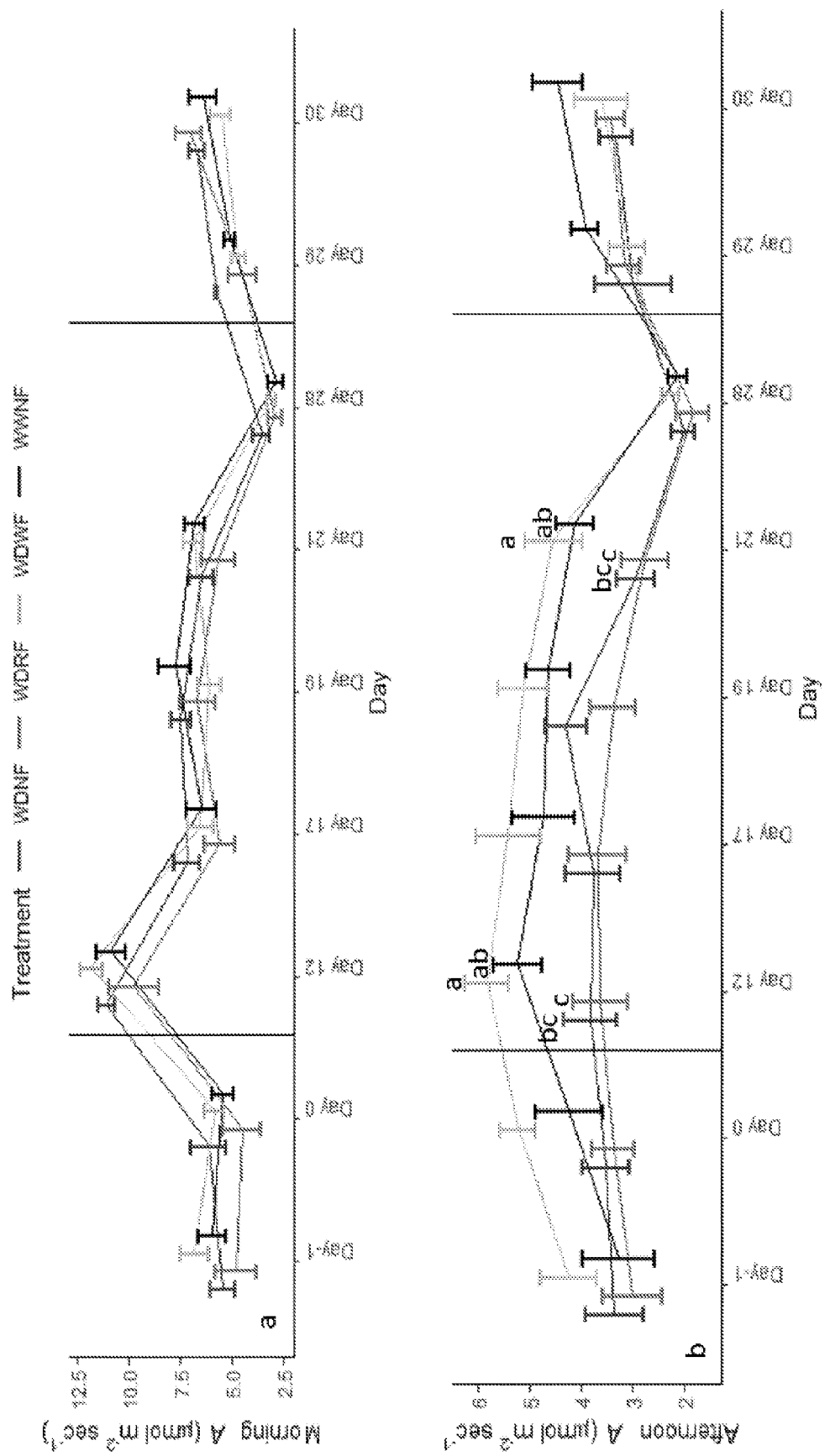

FIG. 16 Provides a graph showing net $CO_2$ assimilation in the morning and afternoon of potted plants that received treatments of 1) water deficit with no particle film (WDNF), 2)water deficit red film (WDRF), 3) water deficit white film (WDWF), 4) well watered no film (WWNF). Water deficit was daily watering to a maximum of −20 kPa and well watered was daily watering to field capacity. White film maintained high photosynthesis (net carbon fixation) throughout. Red film maintained low afternoon photosynthesis throughout, but only days with high vapor pressure deficit showed significant differences.

Figure 17:
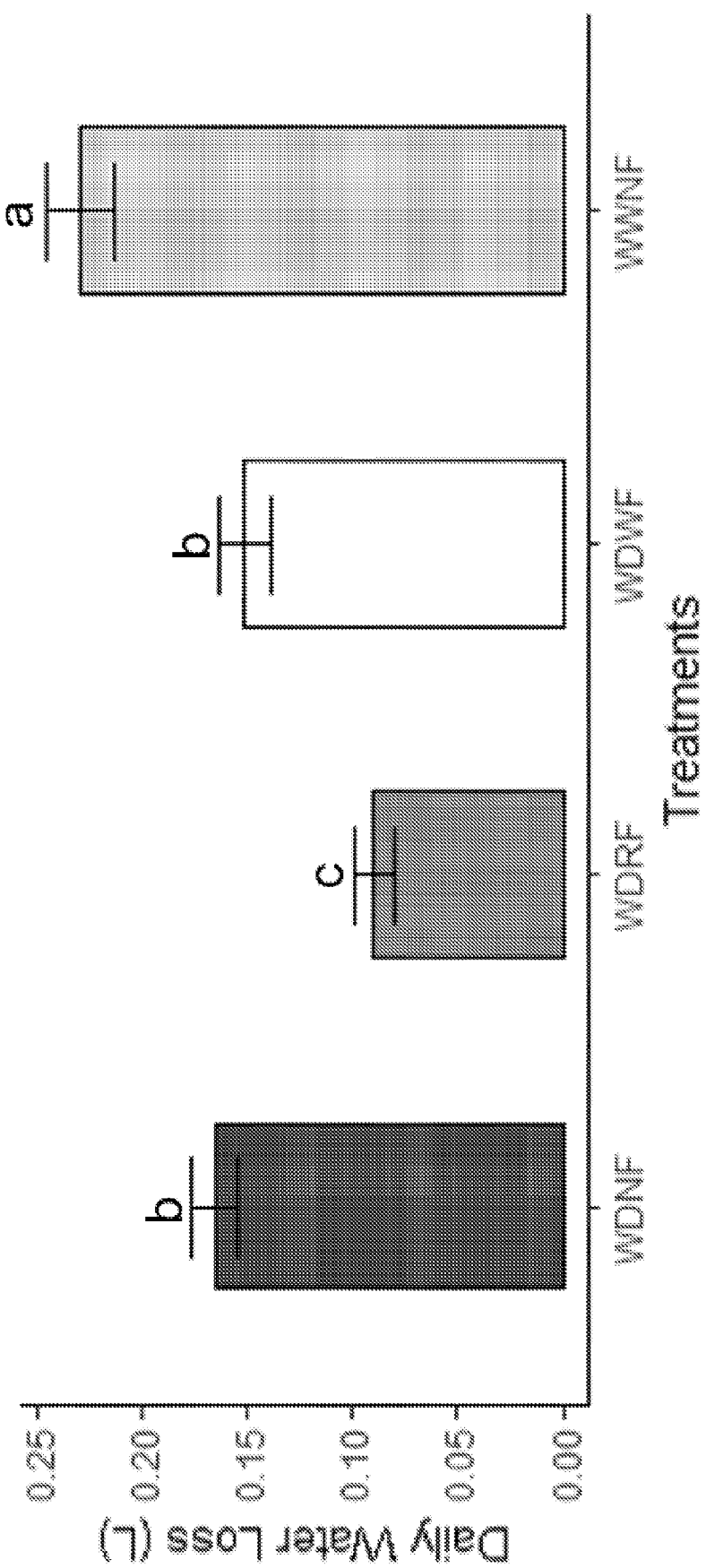
FIG. 17 provides a graph showing effects of kaolin treatment on daily water loss of potted plants that received treatments of 1) water deficit with no particle film (WDNF), 2)water deficit red film (WDRF), 3) water deficit white film (WDWF), 4) well watered no film (WWNF). Water deficit was daily watering to a maximum of −20 kPa and well watered was daily watering to field capacity. Tops of pots were covered with opaque plastic bags white plastic bags to reduce water loss due to evaporation.

FIG. 17 provides a graph showing effects of kaolin treatment on daily water loss of potted plants that received treatments of 1) water deficit with no particle film (WDNF), 2) water deficit red film (WDRF), 3) water deficit white film (WDWF), 4) well watered no film (WWNF). Water deficit was daily watering to a maximum of −20 kPa and well watered was daily watering to field capacity. Tops of pots were covered with opaque plastic bags white plastic bags to reduce water loss due to evaporation. Red film dramatically reduced daily water loss.

Figure 18:
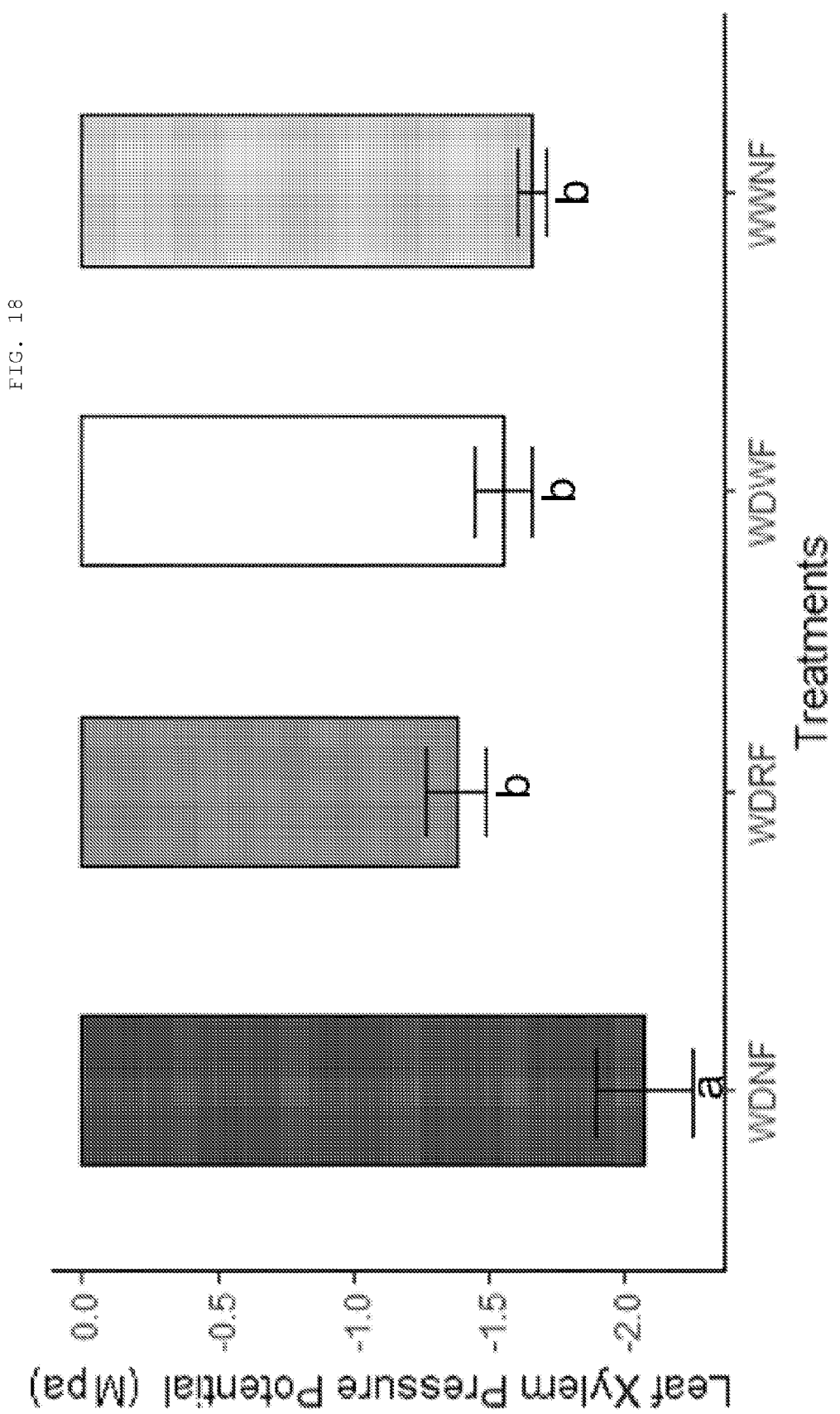
FIG. 18 provides a graph showing leaf xylem water potential of potted plants that received treatments of 1) water deficit with no particle film (WDNF), 2)water deficit red film (WDRF), 3) water deficit white film (WDWF), 4) well watered no film (WWNF). Water deficit was daily watering to a maximum of −20 kPa and well watered was daily watering to field capacity. Tops of pots were covered with opaque plastic bags white plastic bags to reduce water loss due to evaporation.

FIG. 18 provides a graph showing leaf xylem water potential of potted plants that received treatments of 1) water deficit with no particle film (WDNF), 2) water deficit red film (WDRF), 3) water deficit white film (WDWF), 4) well watered no film (WWNF). Water deficit was daily watering to a maximum of −20 kPa and well watered was daily watering to field capacity. Tops of pots were covered with opaque plastic bags white plastic bags to reduce water loss due to evaporation. Both particle films maintained low-leaf water potential during the deficit period.

Conclusions

Red film reduced water loss and maintains leaf water potential.
This likely leads to internal water deficit avoidance:
This is beneficial in a wide range of settings
Red films can be used in the dry season to maintain growth without increasing water demand, as irrigation systems often only suffice to avoid severe deficits.
Red films can be used to reduce hydric demand of HLB-infected trees and maintain growth despite root loss and reduce water conductance capacity.

While various embodiments of the present invention have been shown and described herein, it will be obvious that such embodiments are provided by way of example only. Numerous variations, changes and substitutions may be made without departing from the invention herein. Also, the teachings of any references herein are incorporated in their entirety to the extent not inconsistent with the teachings herein. Accordingly, it is intended that the invention be limited only by the spirit and scope of the appended claims.

What is claimed is:

1. A method of treating a plant disease in a citrus tree infected with Candidatus Liberibacter *asiaticus* (CLas), the method comprising administering a therapeutically effective amount of a red dye-containing kaolin composition to the outer surface of the citrus tree, wherein the administering increases water efficiency in the citrus tree and reduces or prevents worsening of effects or symptoms of the plant disease, wherein the plant disease is huanglongbing (HLB).

2. The method of claim 1, wherein the outer surface comprises leaves.

3. The method of claim 1, wherein growth of the citrus tree treated with dye-containing kaolin composition is increased relative to non-treated citrus tree.

4. The method of claim 1, wherein the administering comprises administering in a dry season for the citrus tree.

5. The method of claim 1, wherein the citrus tree to which the red dye-containing kaolin composition has been administered is able to grow in lower water conditions versus a citrus tree to which no said red dye-containing kaolin composition has been administered.

6. The method of claim 5, wherein lower water conditions comprise water conditions that are less than required for optimal growth of untreated citrus tree.

7. The method of claim 1, wherein said administering increases vigor of the citrus tree.

\* \* \* \* \*